US012683999B2

(12) United States Patent
Mullen et al.

(10) Patent No.: US 12,683,999 B2
(45) Date of Patent: Jul. 14, 2026

(54) DATA SECURITY IN A CLOUD COMPUTING ENVIRONMENT

(71) Applicant: INTERNATIONAL BUSINESS MACHINES CORPORATION, Armonk, NY (US)

(72) Inventors: Shawn Patrick Mullen, Buda, TX (US); Priyanshu Joshi, Haldwani (IN); Sourav Mahanty, Jamshedpur (IN); Subhajit Bhuiya, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 18/436,766

(22) Filed: Feb. 8, 2024

(65) Prior Publication Data

US 2025/0260705 A1     Aug. 14, 2025

(51) Int. Cl.
*H04L 9/40* (2022.01)

(52) U.S. Cl.
CPC .......... *H04L 63/1433* (2013.01); *H04L 63/20* (2013.01)

(58) Field of Classification Search
CPC ............................ H04L 63/1433; H04L 63/20
USPC ............................................... 726/1; 709/224
See application file for complete search history.

(56) References Cited

U.S. PATENT DOCUMENTS

| | | | |
|---|---|---|---|
| 9,444,820 B2 * | 9/2016 | Muppidi | ............. H04L 63/1433 |
| 11,165,807 B2 | 11/2021 | Jordan et al. | |
| 11,533,324 B2 | 12/2022 | Walsh et al. | |
| 11,765,032 B1 * | 9/2023 | Sood | ................... H04L 41/0806 709/220 |
| 12,309,194 B2 * | 5/2025 | Rose | ................... H04L 63/1425 |
| 2016/0080407 A1 * | 3/2016 | Chennamsetty | .... H04L 63/1433 726/25 |
| 2019/0347282 A1 | 11/2019 | Cai et al. | |
| 2020/0004960 A1 * | 1/2020 | Karasovsky | ............ G06F 21/56 |
| 2020/0274782 A1 | 8/2020 | Balaiah et al. | |
| 2020/0329068 A1 | 10/2020 | Findlay | |
| 2022/0103592 A1 * | 3/2022 | Semel | ................. H04L 63/1416 |

(Continued)

OTHER PUBLICATIONS

"More about OSCAL," [online] National Institute of Standards and Technology, US Dept. of Commerce, updated on Nov. 8, 2023, retreived from the Internet: <https://pages.nist.gov/OSCAL/about/>, 3 pg.

(Continued)

*Primary Examiner* — Liang Che A Wang
(74) *Attorney, Agent, or Firm* — CHIP LAW GROUP

(57)     ABSTRACT

An event notification can be received. The event notification can indicate a customer impacting event and a cloud resource name of a cloud resource to which the customer impacting event pertains. Data contained in the cloud resource name can be parsed. Information specifically relevant to the customer impacting event and the cloud resource to which the customer impacting event pertains can be accessed. A document or file including at least a portion of the information specifically relevant to the customer impacting event and the cloud can be created. Responsive to the link to the uniform resource identifier assigned to the document or file being selected, the document or file including the at least the portion of the information specifically relevant to the customer impacting event and the cloud resource to which the customer impacting event pertains can be communicated to a client device.

17 Claims, 3 Drawing Sheets

300

Receive an event notification, the event notification indicating a customer impacting event, and the event notification indicating a cloud resource name of a cloud resource to which the customer impacting event pertains
302

Responsive to receiving the event notification, parse, in real time, data contained in the cloud resource name
304

Access information specifically relevant to the customer impacting event and the cloud resource to which the customer impacting event pertains by querying, using at least a plurality of parameters parsed from the cloud resource name, a compliance evidence database
306

Create, in real time, a document or file including at least a portion of the information specifically relevant to the customer impacting event and the cloud resource to which the customer impacting event pertains, wherein the document or file is accessible to a client device using a link to a uniform resource identifier assigned to the document or file
308

Responsive to the link to the uniform resource identifier assigned to the document or file being selected, communicate to the client device the document or file including the at least the portion of the information specifically relevant to the customer impacting event and the cloud resource to which the customer impacting event pertains
310

(56) References Cited

U.S. PATENT DOCUMENTS

| | | | |
|---|---|---|---|
| 2022/0210195 | A1 | 6/2022 | Parekh et al. |
| 2022/0385682 | A1 * | 12/2022 | Levin ..................... H04L 67/10 |
| 2023/0048513 | A1 | 2/2023 | Gao et al. |
| 2023/0126571 | A1 | 4/2023 | Kirti et al. |
| 2023/0128837 | A1 | 4/2023 | Hu et al. |
| 2024/0311208 | A1 * | 9/2024 | Kandasamy .......... G06F 9/5072 |

OTHER PUBLICATIONS

"NIST Special Publicaiton (SP) 800-53 Rev. 5, Security and Privacy Controls for Information Systems and Organizations," [online] Version Summary, National Institute of Standards and Technology, Joint Task Force, U.S. Department of Commerce [retrieved Feb. 8, 2024], retrieved from the Internet: <https://csrc.nist.gov/pubs/sp/800/53/r5/upd1/final>, 2 pg.

"Security and Privacy Controls for Information Systems and Organizations," [online] National Institute of Standards and Technology, Joint Task Force, U.S. Department of Commerce, NIST Special Publication 800-53, Rev. 5, Sep. 2020, retrieved from the Internet: <https://doi.org/10.6028/NIST.SP.800-53r5>, 492 pg.

"Understanding the Compliance Operator—Compliance Operator | Security and compliance," [online] Red Hat Openshift Documents, Red Hat, Inc. © 2024, Retrieved from the Internet: <https://docs.openshift.com/container-platform/4.9/security/compliance_operator/compliance-operator-understanding.html>, 6 pg.

Mell, P. et al., The NIST Definition of Cloud Computing, National Institute of Standards and Technology, U.S. Dept. of Commerce, Special Publication 800-145, Sep. 2011, 7 pg.

* cited by examiner

100

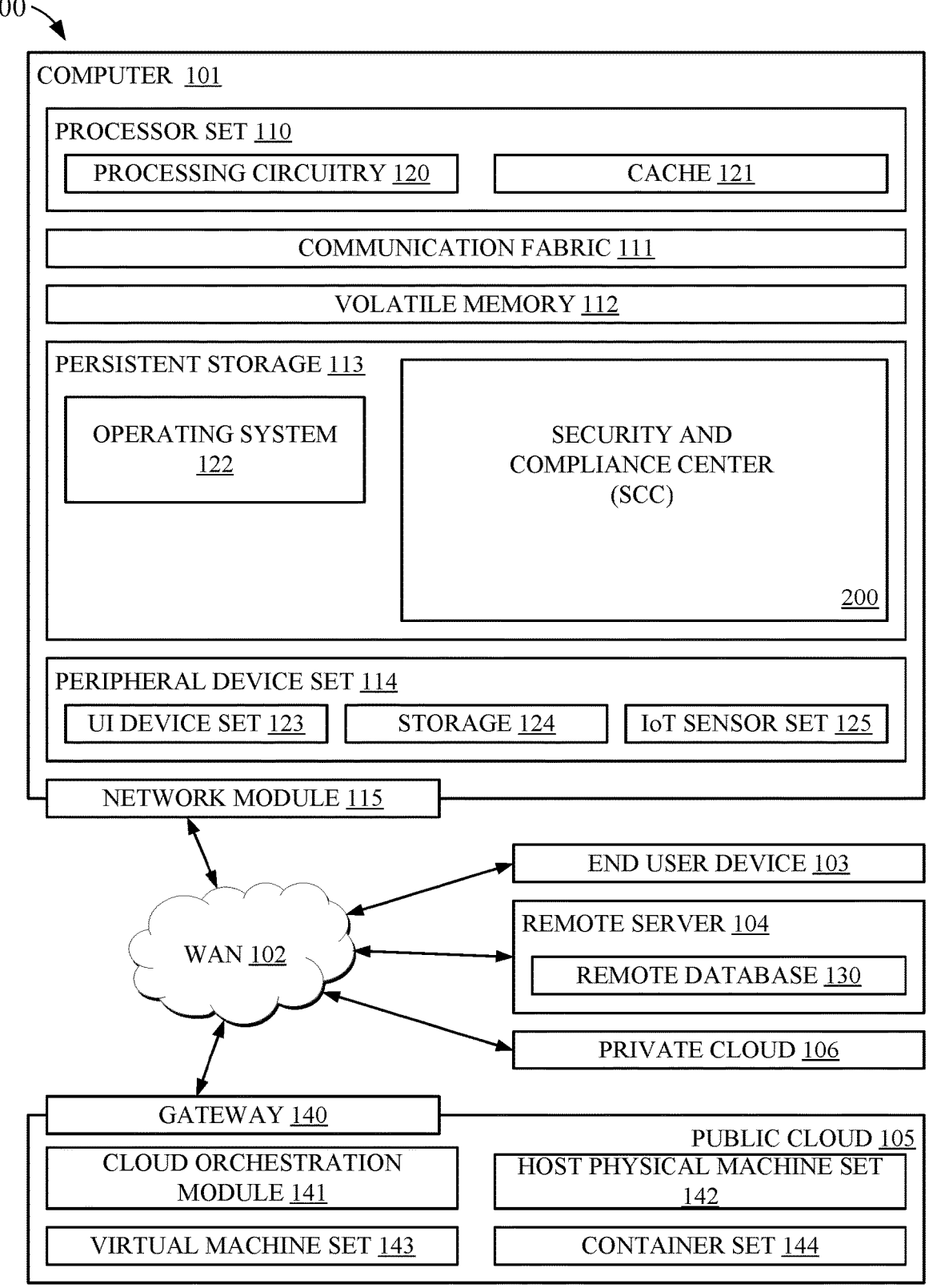

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

SECURITY AND COMPLIANCE CENTER (SCC)

200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141

HOST PHYSICAL MACHINE SET 142

VIRTUAL MACHINE SET 143

CONTAINER SET 144

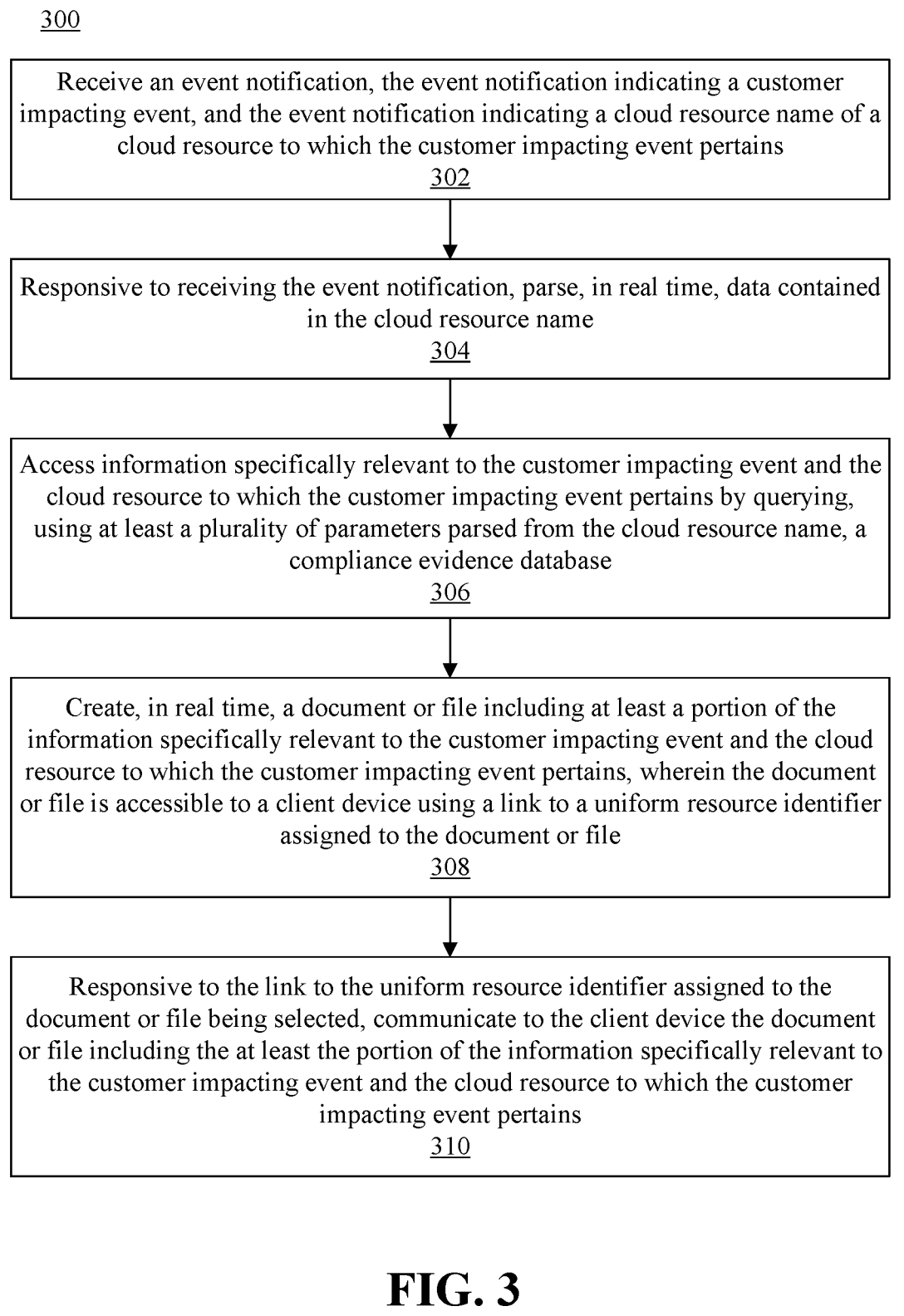

Receive an event notification, the event notification indicating a customer impacting event, and the event notification indicating a cloud resource name of a cloud resource to which the customer impacting event pertains
302

Responsive to receiving the event notification, parse, in real time, data contained in the cloud resource name
304

Access information specifically relevant to the customer impacting event and the cloud resource to which the customer impacting event pertains by querying, using at least a plurality of parameters parsed from the cloud resource name, a compliance evidence database
306

Create, in real time, a document or file including at least a portion of the information specifically relevant to the customer impacting event and the cloud resource to which the customer impacting event pertains, wherein the document or file is accessible to a client device using a link to a uniform resource identifier assigned to the document or file
308

Responsive to the link to the uniform resource identifier assigned to the document or file being selected, communicate to the client device the document or file including the at least the portion of the information specifically relevant to the customer impacting event and the cloud resource to which the customer impacting event pertains
310

FIG. 3

DATA SECURITY IN A CLOUD COMPUTING ENVIRONMENT

BACKGROUND

The present invention relates to data processing systems, and more specifically, to improving cybersecurity in cloud computing environments.

Cloud computing uses various networks, including the Internet, as communication media. By virtue of the Internet being widely accessible, cloud computing services face various security challenges, and cybersecurity is an ongoing concern. In this regard, the European Commission recently introduced the Cyber Resilience Act, which introduces common cybersecurity rules in the European Union for manufacturers and developers of products with digital elements, covering both hardware and software.

SUMMARY

A method includes receiving an event notification, the event notification indicating a customer impacting event, and the event notification indicating a cloud resource name of a cloud resource to which the customer impacting event pertains. The method also can include, responsive to receiving the event notification, parsing, in real time, data contained in the cloud resource name. The method also can include accessing information specifically relevant to the customer impacting event and the cloud resource to which the customer impacting event pertains by querying, using at least a plurality of parameters parsed from the cloud resource name, a compliance evidence database. The method also can include creating, in real time using a processor, a document or file including at least a portion of the information specifically relevant to the customer impacting event and the cloud resource to which the customer impacting event pertains, wherein the document or file is accessible to a client device using a link to a uniform resource identifier assigned to the document or file. The method also can include responsive to the link to the uniform resource identifier assigned to the document or file being selected, communicating to the client device the document or file including the at least the portion of the information specifically relevant to the customer impacting event and the cloud resource to which the customer impacting event pertains.

A system includes a processor programmed to initiate executable operations. The executable operations include the forementioned operations.

A computer program product includes a computer readable storage medium having program code stored thereon. The program code is executable by a data processing system to initiate operations. The operations include the forementioned operations.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

FIG. 1 depicts a cloud computing environment according to an embodiment of the present invention.

FIG. 3 is a flowchart illustrating an example of a method of improving cybersecurity in a cloud computing environment.

DETAILED DESCRIPTION

Figure 2:
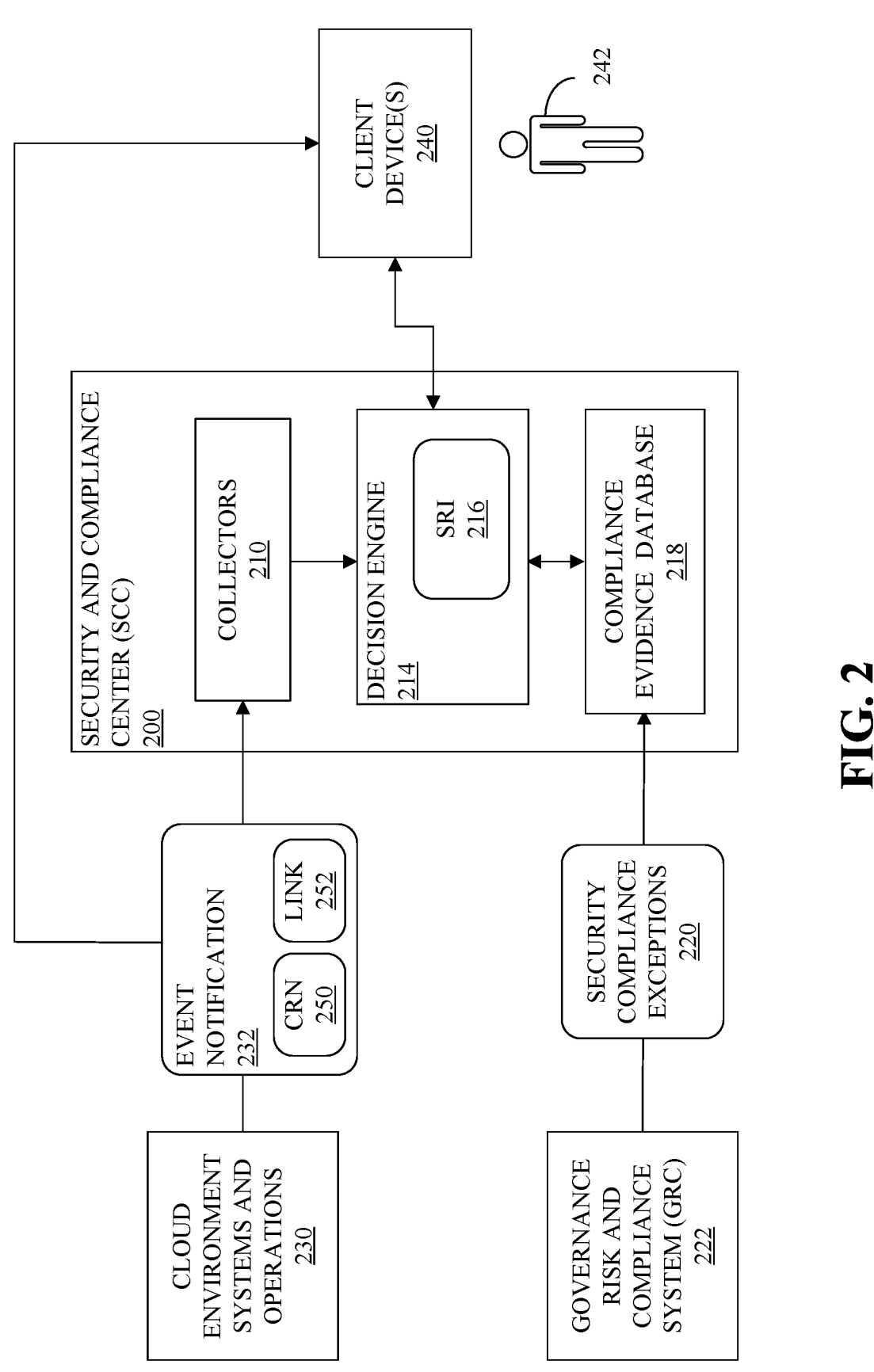
FIG. 2 depicts a computing security environment according to an embodiment of the present invention.

The arrangements described herein are directed to computer technology, and provide an improvement to computer technology. Specifically, the present arrangements improve cybersecurity in cloud computing environments.

In accordance with the inventive arrangements described herein, in response to an event notification being generated for a customer impacting event, the even notification can be communicated to a security and compliance center (SCC). In addition, the event notification can be communicated to one or more client devices used by site reliability engineering (SRE) personnel. The event notification can include a cloud resource name (CRN) for the cloud resource to which the customer impacting event pertains, and a link to the SCC vulnerabilities records that is unique to the CRN of a cloud resource.

Responsive to receiving the event notification, the SCC can determine, in real time, the CRN. Using the CRN, the SCC can query, in real time, a compliance evidence database to access information pertaining to cybersecurity vulnerabilities that may pertain to the cloud resource. Such information need only include information that is specifically relevant to cybersecurity vulnerabilities to which that cloud resource may be susceptible, and information not specifically relevant to that cloud resource need not be included in the information. Initially, the link to the SCC, in the event notification, can be a link to a blank record in the SCC. In real time in response to receiving the event notification, the SCC can make the information, which is specifically relevant to the cybersecurity vulnerabilities that may pertain to the cloud resource, accessible by writing the information into blank record.

Responsive to receiving the event notification, one or more SRE personnel can select, using their client device(s), the link in the event notification and retrieve the information specifically relevant to the cybersecurity vulnerabilities that may pertain to the cloud resource. Notably, since the information need not include information not specifically relevant to that cloud resource, dissemination of sensitive cybersecurity information can be limited only to that information that may be useful for analyzing and resolving the customer impacting event. Accordingly, those without a need to know need not receive sensitive cybersecurity information, thus increasing cybersecurity in a cloud computing environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as security and compliance center (SCC) 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 depicts a computing security environment according to an embodiment of the present invention. The computing security environment can include SCC 200. SCC 200 can include one or more collectors 212 and a decision engine 214. Decision engine 214 can include security resource insights for outages (SRI) 216. SCC 200 also can include, or otherwise can be communicatively linked to, a compliance evidence database 218.

In operation, compliance evidence database 218 can receive security compliance exceptions 220 from a governance risk and compliance system (GRC) 222. GRC 222 can provide controls that are monitored to ensure a cloud computing environment is configured securely and correctly in accordance with baseline standards. Access to GRC 222 data can be tightly controlled, though. In this regard, GRC 222 data may be confidential and restricted.

Sometimes baseline standards cannot be met due to issues that arise. For example, a software update may be needed for a particular software package to fix a known security vulnerability. GRC 222 security controls may indicate to apply the software update, but if the software update is applied it may break a cloud resource, for example a cloud service. Thus, it may be the case that the software update cannot be applied immediately, but instead may be scheduled to be applied after measures are taken to ensure that the software patch can be applied to the cloud resource without breaking the cloud resource. Security compliance exceptions 220 can be created in GRC 222 to indicate such circumstances. Security compliance exceptions 220 can include information indicating specific cloud resources affected by the security vulnerability, for example cloud resources providing the cloud service for which the software update is applicable.

In this regard, security compliance exceptions 220 can indicate known cybersecurity vulnerabilities. Further, security compliance exceptions 220 can provide information pertaining to the cybersecurity vulnerabilities, for example the severity of a security vulnerability, how a security vulnerability can be exploited, mitigating control's that can be used to prevent exploitation, etc. Information provided by security compliance exceptions 220 also can include, for example, solutions to security vulnerabilities, target dates for when those solutions are anticipated to be implemented, specific actions to be implemented to mitigate the security vulnerabilities, justifications for security vulnerability exceptions, policies violated by not immediately implementing the security resolutions, classifications of the security vulnerabilities, security review of the security vulnerabilities, tags assigned to the security vulnerabilities, comments pertaining to the security vulnerabilities, solutions to the security vulnerabilities, possible steps to mitigate susceptibility to the security vulnerabilities, target dates for implementation of the solutions, severity (e.g., risk) levels for the security vulnerabilities, identified and/or anticipated impacts of the security vulnerabilities, information pertaining to justification for exemptions for security vulnerabilities, etc.

In addition to security compliance exceptions 220, compliance evidence database 218 can include a plethora of other data pertaining to the cloud resources to which SCC 200 is assigned. Such data can include, but are not limited to, cloud resource names (CRNs) assigned to specific cloud resources, locations of specific cloud resources, types of services provided by specific cloud resources, services provided by specific cloud resources, one or more site reliability engineering (SRE) teams assigned to specific cloud resources, members of the SRE team(s), authorized users of specific cloud resources, levels or training provided to personnel interacting with specific cloud resources, the number of personnel interacting with specific cloud resources, etc. Further, SCC 200 can directly fetch cloud resources configuration data and verify the cloud resources configuration meets a specified requirement. In this regard, compliance evidence database 218 can receive data not only from GRC 222, but also from one or more other information sources, including one or more other data processing systems, one or more other applications, and/or one or more users.

In cloud computing environments customer impacting events sometimes occur. A customer impacting event is a problem with a cloud resource that impacts customers. In response to a customer impacting event, cloud environment systems and operations 230 can generate an event notification 232 indicating the customer impacting event. Cloud environment systems and operations 230 can communicate event notification 232 to a collector 210 of SCC 200 and to at least one client device 240 of at least one SRE personnel 242. Event notification 232 can be communicated to client device 240, for example, as a paging notification, a text message, an e-mail, etc.

Event notification 232 can include information describing the customer impacting event, as well as a CRN 250 for the cloud resource to which the customer impacting event pertains. CRN 250 can be any identifier uniquely assigned to a cloud resource. CRN 250 can include a plurality of parameters describing the cloud resource beyond a single parameter. By way of example, CRN 250 can have the following base canonical format:

Crn:version:cname:ctype:service-name:location:scope:
    service-instance:resource-type:resource where the CRN 250 can include the following segments:

Crn: CRN indication version: identifies the version of the CRN format cname: identifies the cloud instance ctype: identifies the type of cloud instance that is represented by the specified cname segmentservice-name: identifies a capability (service, component, or product) that is offered by the cloud location: the cloud geography/region/zone/data center that the resource resides scope: identifies the containment or owner of the resource service-instance: identifies the service instance uniquely resource-type: type of cloud resource resource: format of the resource segment The values of the resource-type and resource segments can vary by service. Nonetheless, the present arrangements are not limited to these examples, and CRN 250 can be in any other form of identifier suitable to uniquely identify a cloud resource.

In addition, event notification 232 can include a link 252 (e.g., a hyperlink) to SCC 200 that is unique to the customer impacting event. In illustration, link 252 can include a uniform resource identifier (URI), e.g., a uniform resource locator (URL), identifying SCC 200 and an identifier for the customer impacting event that is unique to the customer impacting event. By way of example, link 252 can be of the following form:

https://www.acmescc.net/1234567 where "www.acmescc.net" is the URI for SCC 200 and "1234567" is the identifier for the customer impacting event. Event notification 232 can indicate that link 252 provides security information pertaining to the customer impacting event. In illustration, event notification 232 can include text indicating to SRE personnel 242 to select link 252 to access the security information pertaining to the customer impacting event.

Event notification 232 can initiate SCC 200 to analyze the customer impacting event. Responsive to receiving event notification 232, collector 210 can parse, in real time, CRN 250 and link 252 from event notification 232. When Event Notification 232 is sent, link 252 can point to an SCC record that initially is empty. Upon receiving event notification 232, SCC 200, real time, can populate the record with security vulnerabilities specific to the CRN of a cloud service to which the customer impacting event pertains. Collector 210 can communicate, in real time, CRN 250 and link 252 to decision engine 214.

Responsive to SCC 200 receiving CRN 250 and link 252 from collector 210, SRI 216 can parse, in real time, data contained in CRN 250. Using that data, SRI 216 can, in real time, query compliance evidence database 218 to access information specifically relevant to the customer impacting event and the affected cloud resource. For example, SRI 216 can use a plurality of parameters specified in, and parsed from, CRN 250 as query search parameters (e.g., indexes) used to query compliance evidence database 218. Accordingly, there may be no need for configuration complex decision rules in order to query compliance evidence database 218 for relevant known security issues. Instead, SRI 216 can uniquely dissect CRN 250, based on structure of CRN 250, to generate one or more queries communicated to compliance evidence database 218 to access information specifically relevant to the customer impacting event and the affected cloud resource.

Information accessed from compliance evidence database 218 can indicate security vulnerabilities to which the cloud resource is susceptible. In illustration, the accessed information can indicate open threat vectors, severity of the open threat vectors, etc. to the cloud resource, and even the computing environment at large. Nonetheless, the accessed information can indicate one or more exact security vulnerability matches for the cloud resource, if one or more of such security vulnerabilities are known to exist. Such information can include information received by compliance evidence database 218 from GRC 222, as well as information compliance evidence database 218 receives from other sources.

Results to the query provided by compliance evidence database 218 can indicate whether the particular cloud resource has a known security vulnerability. If so, the results from the query can indicate whether the severity (e.g., risk) is specific to the cloud resource, specific to the cloud resource location, specific to a particular entity managing the cloud resource, etc. Results from the query also can indicate information pertaining to personnel associated with the cloud resource, such as skill levels, training levels, etc.

SRI 216 can, in real time, create a document and/or file including at least a portion of the information specifically relevant to the customer impacting event and the cloud resource to which the customer impacting event pertains. In one or more arrangements, the document and/or file can include security information pertaining to the cloud resource. In one or more arrangements, the document and/or file can include information indicating potential impacts to the cloud resource related to security vulnerabilities identified for the cloud resource that potentially impact security of the cloud resource.

The document and/or file can be written into the SCC record, pointed to by link 252 in event notification 232. In this regard, the document and/or file can include at least a portion of the data included in results to the query provided by compliance evidence database 218. This process ensures least-privileged-access and need-to-know security principles by only exposing to SRE 242, at the time of the event, information scoped specifically to the CRN of the cloud resource to which the customer impacting event pertains.

Responsive to creating the document and/or file, SRI 216 can assign to that document and/or file the identifier for the customer impacting event. In illustration, if the link 252 has the form "https://www.acmescc.net/1234567," SRI 216 can assign to the document and/or file identifier "1234567." Accordingly, SRI 216 can assign to that document and/or file the URI "https://www.acmescc.net/1234567" responsive creating the document and/or file. Thus, link 252 in event notification 232 can link to the URI and can be selected by at least one user (e.g., at least one SRE personnel 242), via client device 240, to request that document and/or file from SCC 200. In response, SCC 200 can communicate the document and/or file to client device 240, and client device 240 can present the document and/or file to SRE personnel 242, for example via a display of client device 240.

The following information is an example of information that may be presented to SRE personnel 242 by the document and/or file responsive to the SRE personnel 242 selecting link 252, though the present arrangements are not limited in this regard:

[RSOS] Insufficient running pods for deployment is Triggered

TIP Runbook URL: https://pages.github.ibm.com/riaas/regional-storage-docs/support-personnel-documentation/insufficient_running_pods_alert TIP Situation: Deployment pod is down TIP Short Description: Some regional-storage pods are not running in rias-ng-br-sao-sao05-prod for the past 10 minutes TIP Related Security Risks: Link 252 pointing to SRI 216 generated file and/or documents concerning the customer impacting event affecting the cloud service TIP Console: toc TIP CRN: crn:v1:::is-volume:::rias-ng-br-sao-sao05-prod:microservice:regional-storage Event Generated:

Severity: High

Metric:
kube_deployment_spec_replicas=3
kube_pod_sysdig_status_ready=2.9333

Segment:
kube_cluster_name='rias-ng-br-sao-sao05-prod'

Scope:
kube_deployment_name='regional-storage'
kube_namespace_name='riaasstorage'

Time: 02/06/2023 08:41 PM UTC

State: Triggered

Notification URL: https://br-sao.monitoring. cloud.ibm.com:443/api/oauth/openid/IBM/ 2c4a1985f9d5c10bd4842d2d3989088e/240efe0c- 22a1-4a84-a5a8-8da4alaa9a57?redirect Route=%2Fevents%2Fnotifications%2F1%3A24192 00%2F1479298%2Fdetails
In this example, the various information identified using the term "TIP" can help guide SRE personnel 242 to a solution for the customer impacting event.]

In one or more arrangements, SRI 216 can determine the severity of a known security vulnerability based upon whether there are one or more missing and/or insufficient mitigation measures for an identified security vulnerability in security compliance exceptions 220. In this regard, the severity of a known security vulnerability can be inversely correlated with a number of missing and/or insufficient security vulnerability mitigation controls. For example, an identified security vulnerability having missing and/or insufficient security vulnerability mitigation controls can be ranked as being more severe in comparison to a circumstance in which the identified security vulnerability has one or more sufficient security vulnerability mitigation controls.

FIG. 3 is a flowchart illustrating an example of a method 300 of improving cybersecurity in a cloud computing environment. Method 300 can be implemented by SCC 200 of FIGS. 1 and 2.

At step 302, SCC 200 can receive an event notification, the event notification indicating a customer impacting event, and the event notification indicating a cloud resource name of a cloud resource to which the customer impacting event pertains. In one or more arrangements, the cloud resource name can point to an underlying resource that supports the cloud resource. For example, a cloud resource can be cloud storage, and an underlying resource can be a storage controller that, if failing, can affect the cloud storage.

At step 304, SCC 200 can, responsive to receiving the event notification, parse, in real time, data contained in the cloud resource name.

At step 306, SCC 200 can access information specifically relevant to the customer impacting event and the cloud resource to which the customer impacting event pertains by querying, using at least a plurality of parameters parsed from the cloud resource name, a compliance evidence database.

At step 308, SCC 200 can create, in real time, a document or file including at least a portion of the information specifically relevant to the customer impacting event and the cloud resource to which the customer impacting event pertains, wherein the document or file is accessible to a client device using a link to a uniform resource identifier assigned to the document or file.

At step 310, SCC 200 can, responsive to the link to the uniform resource identifier assigned to the document or file being selected, communicate to the client device the document or file including the at least the portion of the information specifically relevant to the customer impacting event and the cloud resource to which the customer impacting event pertains.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Several definitions that apply throughout this document will now be presented.

As defined herein, the term cloud resource name means an identifier assigned to a cloud resource that is unique to that cloud resource.

As defined herein, the term "customer impacting event" means an event that disrupts, in a negative manner, at least one customer's use of a cloud resource.

As defined herein, the term "cloud resource" means at least one computing resource, provided on-demand by at least one processor, computer persistent storage and/or computer volatile memory, accessible by a plurality of users via the Internet.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "server" means a data processing system configured to share services with one or more other data processing systems.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

What is claimed is:

1. A computer-implemented method, comprising:
   receiving an event notification, wherein
     the event notification indicates a customer impacting event and a cloud resource name of a cloud resource to which the customer impacting event pertains, and the event notification comprises a link to a record that initially is empty;

based on the receiving of the event notification, parsing, in real time, data contained in the cloud resource name;

querying, using at least a plurality of parameters parsed from the cloud resource name, a compliance evidence database;

accessing, based on the querying of the compliance evidence database, information specifically relevant to the customer impacting event and the cloud resource;

creating, in real time using a processor, a document or a file including at least a portion of the information specifically relevant to the customer impacting event and the cloud resource, wherein the document or the file is accessible to a client device using the link to a uniform resource identifier;

assigning the uniform resource identifier to the document or the file based on the creating of the document or the file, wherein the assigning of the uniform resource identifier to the document or the file includes writing the record that initially is empty with the document or the file; and based on the link to the uniform resource identifier being selected, communicating to the client device the document or the file.

2. The computer-implemented method of claim 1, wherein the accessing of the information specifically relevant to the customer impacting event and the cloud resource comprises accessing security compliance exceptions pertaining to at least one security vulnerability to which the cloud resource is susceptible.

3. The computer-implemented method of claim 2, further comprising:

determining a severity of the at least one security vulnerability based on one or more missing or insufficient mitigation measures for the at least one security vulnerability in the security compliance exceptions.

4. The computer-implemented method of claim 2, wherein the accessing of the security compliance exceptions pertaining to the at least one security vulnerability to which the cloud resource is susceptible comprises accessing the security compliance exceptions from a governance risk and compliance system.

5. The computer-implemented method of claim 1, wherein the parsing of the data contained in the cloud resource name comprises parsing, from the cloud resource name, a location of the cloud resource; and the querying of the compliance evidence database comprises querying of the compliance evidence database using the location of the cloud resource as a query search parameter.

6. The computer-implemented method of claim 1, further comprising:

limiting dissemination of sensitive security information pertaining to the customer impacting event only to information that is useful for analyzing and resolving the customer impacting event.

7. A system, comprising:

a processor programmed to initiate executable operations comprising:

receiving an event notification, wherein the event notification indicates a customer impacting event and a cloud resource name of a cloud resource to which the customer impacting event pertains, and the event notification comprises a link to a record that initially is empty;

based on the receiving of the event notification, parsing, in real time, data contained in the cloud resource name;

querying, using at least a plurality of parameters parsed from the cloud resource name, a compliance evidence database;

accessing, based on the querying of the compliance evidence database, information specifically relevant to the customer impacting event and the cloud resource;

creating, in real time, a document or a file including at least a portion of the information specifically relevant to the customer impacting event and the cloud resource, wherein the document or file is accessible to a client device using the link to a uniform resource identifier;

assigning the uniform resource identifier to the document or the file based on the creating of the document or the file, wherein the assigning of the uniform resource identifier to the document or the file includes writing the record that initially is empty with the document or the file; and based on the link to the uniform resource identifier-being selected, communicating to the client device the document or the file.

8. The system of claim 7, wherein the accessing of the information specifically relevant to the customer impacting event and the cloud resource comprises accessing security compliance exceptions pertaining to at least one security vulnerability to which the cloud resource is susceptible.

9. The system of claim 8, the executable operations further comprising:

determining a severity of the at least one security vulnerability based on one or more missing or insufficient mitigation measures for the at least one security vulnerability in the security compliance exceptions.

10. The system of claim 8, wherein the accessing of the security compliance exceptions pertaining to the at least one security vulnerability to which the cloud resource is susceptible comprises accessing the security compliance exceptions from a governance risk and compliance system.

11. The system of claim 7, wherein the parsing of the data contained in the cloud resource name comprises parsing, from the cloud resource name, a location of the cloud resource; and the querying of the compliance evidence database comprises querying of the compliance evidence database using the location of the cloud resource as a query search parameter.

12. The system of claim 7, the executable operations further comprising:

limiting dissemination of sensitive security information pertaining to the customer impacting event only to information that is useful for analyzing and resolving the customer impacting event.

13. A computer program product, comprising:

one or more computer readable storage mediums having program code stored thereon, the program code stored on the one or more computer readable storage mediums collectively executable by a data processing system to initiate operations including:

receiving an event notification, wherein the event notification indicates a customer impacting event and a cloud resource name of a cloud resource to which the customer impacting event pertains, and the event notification comprises a link to a record that initially is empty;

based on the receiving of the event notification, parsing, in real time, data contained in the cloud resource name;

querying, using at least a plurality of parameters parsed from the cloud resource name, a compliance evidence database;

accessing, based on the querying of the compliance evidence database, information specifically relevant to the customer impacting event and the cloud resource;

creating, in real time, a document or a file including at least a portion of the information specifically relevant to the customer impacting event and the cloud resource, wherein the document or file is accessible to a client device using the link to a uniform resource identifier;

assigning the uniform resource identifier to the document or the file based on the creating of the document or the file, wherein the assigning of the uniform resource identifier to the document or the file includes writing the record that initially is empty with the document or the file; and based on the link to the uniform resource identifier being selected, communicating to the client device the document or the file.

14. The computer program product of claim 13, wherein the accessing of the information specifically relevant to the customer impacting event and the cloud resource comprises accessing security compliance exceptions pertaining to at least one security vulnerability to which the cloud resource is susceptible.

15. The computer program product of claim 14, wherein the program code further initiate the operations comprising:

determining a severity of the at least one security vulnerability based on one or more missing or insufficient mitigation measures for the at least one security vulnerability in the security compliance exceptions.

16. The computer program product of claim 14, wherein the accessing of the security compliance exceptions pertaining to the at least one security vulnerability to which the cloud resource is susceptible comprises accessing the security compliance exceptions from a governance risk and compliance system.

17. The computer program product of claim 13, wherein the parsing of the data contained in the cloud resource name comprises parsing, from the cloud resource name, a location of the cloud resource; and the querying of the compliance evidence database comprises querying of the compliance evidence database using the location of the cloud resource as a query search parameter.

\* \* \* \* \*